(12) United States Patent
Witte et al.

(10) Patent No.: US 11,926,329 B2
(45) Date of Patent: Mar. 12, 2024

(54) MOTOR VEHICLE CONTROL MODULE AND METHOD, COMPRISING AN EVALUATION OF REAR WHEEL SPEED BASED ON THE FRONT WHEELS ONLY

(71) Applicant: FOUNDATION BRAKES FRANCE, Drancy (FR)

(72) Inventors: Lennart Witte, Strasbourg (FR); Alex Patrão Carqueijò, Pantin (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 211 days.

(21) Appl. No.: 17/291,453

(22) PCT Filed: Nov. 8, 2019

(86) PCT No.: PCT/FR2019/052674
§ 371 (c)(1),
(2) Date: May 5, 2021

(87) PCT Pub. No.: WO2020/099768
PCT Pub. Date: May 22, 2020

(65) Prior Publication Data
US 2022/0001881 A1    Jan. 6, 2022

(30) Foreign Application Priority Data
Nov. 12, 2018  (FR) ........................................ 1860439

(51) Int. Cl.
*B60W 40/105* (2012.01)
*B60W 30/18* (2012.01)

(52) U.S. Cl.
CPC .... *B60W 40/105* (2013.01); *B60W 30/18109* (2013.01); *B60W 2520/26* (2013.01); *B60W 2520/28* (2013.01)

(58) Field of Classification Search
CPC ......... B60W 40/105; B60W 30/18109; B60W 2520/26; B60W 2520/28; B60W 30/18172; B60W 40/10; B60T 2250/04; B60T 8/172
See application file for complete search history.

(56) References Cited

U.S. PATENT DOCUMENTS

| 5,387,031 A | 2/1995 | Watanabe |
| 2018/0244257 A1* | 8/2018 | Kneitz .................. B60K 6/448 |

(Continued)

FOREIGN PATENT DOCUMENTS

| FR | 2327119 A1 | 5/1977 |
| FR | 2386433 A1 | 11/1978 |

(Continued)

OTHER PUBLICATIONS

International Search Report for PCT/FR2019/052674 dated Feb. 17, 2020.

(Continued)

*Primary Examiner* — Sze-Hon Kong
(74) *Attorney, Agent, or Firm* — Pearne & Gordon LLP

(57) ABSTRACT

An evaluation of the speed of movement of a rear wheel of a motor vehicle on the ground, in particular on the inside of a bend, is made exclusively according to the speeds of the front wheels, in situations in which a direct measurement is not possible or in order to accurately evaluate occurrences of wheel lock-up or wheel slip. The invention can be applied to improving the braking setpoints when cornering.

8 Claims, 2 Drawing Sheets

(56) References Cited

U.S. PATENT DOCUMENTS

2020/0132192 A1\* 4/2020 Oh ............................ G01P 3/44
2020/0223408 A1\* 7/2020 Goto ..................... B60T 13/662
2020/0276975 A1\* 9/2020 Passmann ............. B60W 10/18

FOREIGN PATENT DOCUMENTS

| GB | 1431466 A | | 4/1976 | |
|---|---|---|---|---|
| GB | 1592932 A | \* | 7/1981 | .............. B60T 8/175 |
| GB | 1592932 A | | 7/1981 | |
| WO | 2015114280 A1 | | 8/2015 | |

OTHER PUBLICATIONS

Written Opinion for PCT/FR2019/052674 dated Feb. 17, 2020.
Search Report for French application No. FR 1860439 dated Sep. 12, 2019.

\* cited by examiner

MOTOR VEHICLE CONTROL MODULE AND METHOD, COMPRISING AN EVALUATION OF REAR WHEEL SPEED BASED ON THE FRONT WHEELS ONLY

CROSS-REFERENCE TO RELATED APPLICATIONS

This is a National Stage of PCT international application PCT/FR2019/052674, filed on Nov. 8, 2019, which claims the priority of French Patent Application No. 1860439, filed Nov. 12, 2018, both of which are incorporated herein by reference in their entirety.

The invention is directed to a module as well as a method for controlling an automobile, wherein the speed of the rear wheels is evaluated by the speeds of the front wheels only.

Under some circumstances, such as lock or skid, the ground travel speed of a wheel, and especially a rear wheel, cannot be determined by directly measuring its rotational speed. It is also possible that the measurement may fail after damage to the dedicated device. This is why it is contemplated with this invention to carry out an indirect evaluation of the ground travel speed of a rear wheel of a running automobile, by resorting to evaluations of the speeds of the steering wheels, typically front wheels.

The evaluation of rear wheel speed thus obtained may be used for various applications. One of them could be a braking decision aid, or on the contrary an anti-lock braking decision aid, for the rear wheels.

The speed evaluation in question relates to the travel speed of the rear wheel on the road. The actual speed of the wheel will be different in the event of lock or skid. A (non-limiting) application contemplated here is therefore a comparison of the speed evaluation provided here with a measurement or another evaluation of the rear wheel speed, obtained differently and which may especially include a measurement of the rotational speed of the rear wheel. The evaluation made according to the invention may, however, be used only to evaluate the speed of the rear wheel, without taking into account lock or skid, if a direct measurement has become impossible, due to a sensor failure or otherwise.

One advantage of the invention is that the evaluation of the ground speed of the rear wheel can be of good accuracy, even for a wheel placed inside a tight bend, taking steering conditions of the front wheels into account.

The invention may relate to one or both rear wheels at the same time. The rear wheels may or may not be drive or steering wheels.

Related prior art includes FR 2386433 A1, but which describes a method where a reference speed of a vehicle is estimated by choosing either a front wheel speed measurement or a rear wheel speed measurement. There is therefore no indirect evaluation of the speed of the rear wheels by that of the front wheels, since the estimated reference speed is an overall vehicle speed.

In a general form, the invention relates to a module for evaluating a speed of a rear wheel of an automobile, characterised in that it is filled in by input parameters which comprise, as the only speed parameters, evaluations of speeds of front wheels of the automobile, in that the rear wheel speed is evaluated by a formula $V_{eAR}=$ $$\left(\frac{V_{moy}}{3} + \frac{2}{3}\frac{V_{min}^2}{V_{max}}\right)K_{corr},$$

where $V_{eAR}$ is the rear wheel speed evaluation, $V_{min}$ and $V_{max}$ the front wheel speed evaluations with $V_{min} \leq V_{max}$, $V_{moy} = \frac{1}{2}(V_{min}+V_{max})$, and $K_{corr}$ is a correction coefficient, and in that $$K_{corr} = 1 \text{ for } \frac{V_{max}}{V_{min}} \leq S_1, \text{ and } K_{corr} \leq 1 \text{ for } \frac{V_{max}}{V_{min}} > S_1,$$

$S_1$ being a fixed threshold.
And if $K_{corr}$ is decreasing when $$\frac{V_{max}}{V_{min}}$$

increases above $S_1$, the evaluation can remain accurate for all or almost all, even the smallest turning radii.

Even more preferably, $K_{corr}$ is constant when $S_2$ reaches a second fixed threshold with $S_2 > S_1$; and more precisely it can be recommended that $S_1 = 1.15$, $S_2 = 1.4$, $K_{corr}$ linear between $S_1$ and $S_2$ and $K_{corr} = 0.6$ at $S_2$.

The invention can be dedicated to an automobile control method, characterised in that it comprises a module according to the foregoing, applied to a braking decision for the rear wheels.

A possible embodiment thereby consists in that an evaluation of the rear wheel speed, made by said module, is used to give a reference rear wheel speed below which a rear wheel braking is prevented.

For this, it can be contemplated that the reference speed corresponds to the rear wheel speed evaluation multiplied by a constant coefficient, less than 1.

Certain aspects, characteristics and advantages of the invention will now be described in detail by means of the following figures, appended for illustrative purposes only, which allow a detailed description of an embodiment thereof:

Figure 1:
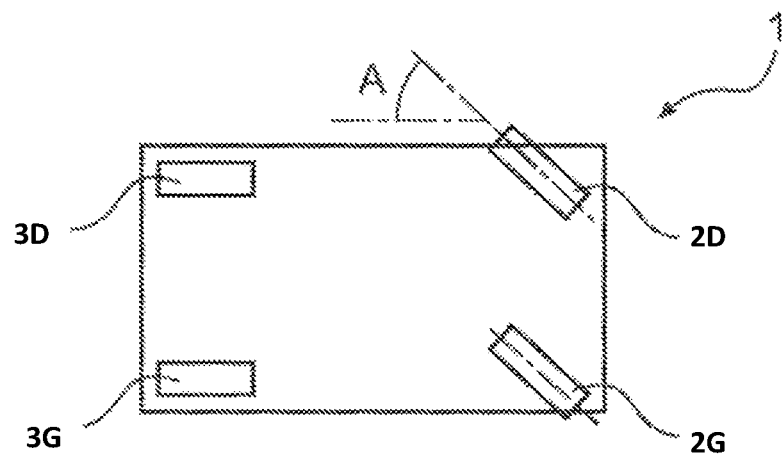
FIG. 1 is a schematic view of an automobile in the method of turning.

FIG. 1 partially represents an automobile, especially its chassis 1 mounted onto left and right front wheels 2G and 2D and left and right rear wheels 3G and 3D. The drive front wheels 2D and 2G are represented with a turning angle A that induces a turning radius R. In the non-limiting example in FIG. 1, the rear wheels 3D and 3G are neither drive nor steering wheels, but are equipped with brakes, which are not represented in this figure, and can be used for parking, but also contribute to braking.

Figure 2:
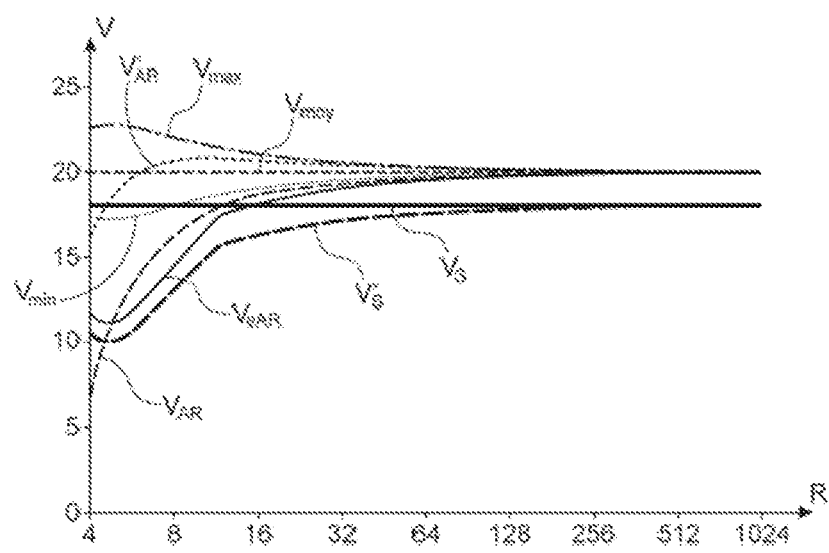
FIG. 2 is a diagram of wheel speeds.
Figure 3:
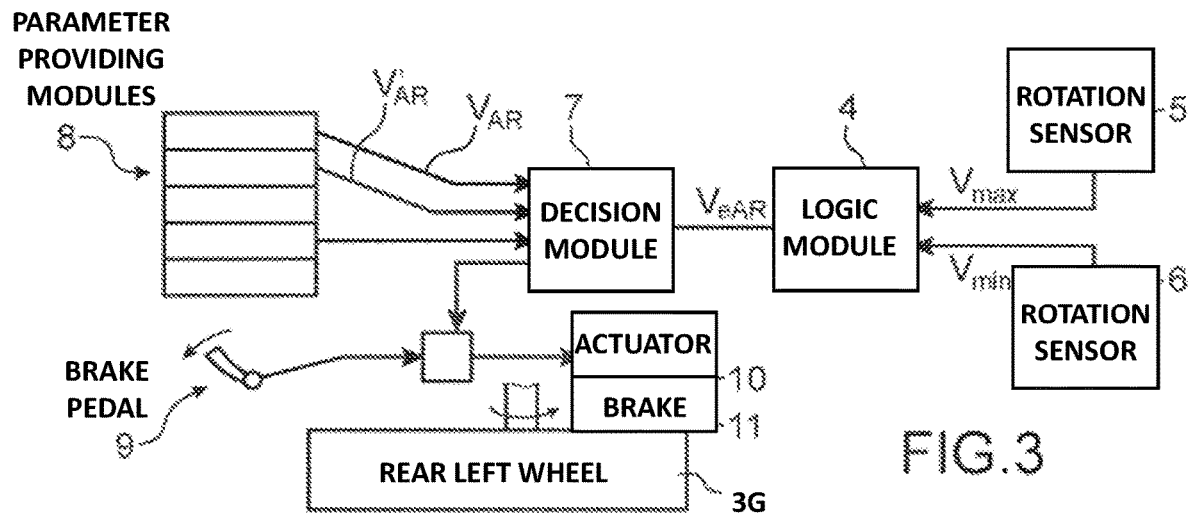
FIG. 3 illustrates the environment of the control module.

FIG. 2 illustrates some of the wheel speed V curves as a function of the automobile's turning radius R. Speeds V are in arbitrary units. These speeds are ground travel speeds; the linear speeds of the wheels, which are proportional to their rotational speeds, may be different in the event of lock, skid, or other rolling faults. An average speed of the automobile $V_{moy}$ will be assumed to be the same regardless of the turning radius under consideration. The travel speed of the outer front wheel, here 2D, is thereby given by the curve $V_{max}$, and the speed of the inner front wheel, here 2G, by the curve $V_{min}$. The speed curve $V_{AR}$ of the inner rear wheel, here 3G, and $V'_{AR}$ the curve of the outer rear wheel, here 3D, are also represented.

Figure 4:
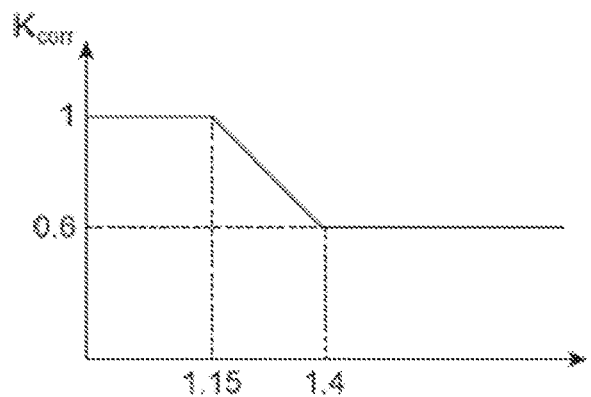
FIG. 4 represents a correction coefficient function.

A first purpose of the invention is to be able to evaluate the speed of the rear wheels 3G and 3D, and especially the speed ($V_{AR}$) of the wheel inside a bend, using only the front wheel travel speed $V_{max}$ and $V_{min}$ information. A logic module 4 is used which is embedded into the vehicle control circuits and which has two inputs fed by the speeds $V_{max}$ and $V_{min}$, which can be provided by rotation sensors 5 and 6 sensing rotation of the axes of these wheels 2D and 2G, or by any other means. Module 4 then performs the calculation $$V_{eAR} = \left(\frac{V_{moy}}{3} + \frac{2}{3}\frac{V_{min}^2}{V_{max}}\right)K_{corr},$$

where $V_{eAR}$ is the evaluation of the speed of the rear wheel inside the bend, $V_{min}$ and $V_{max}$ are still the evaluations or measurements of the speeds of the front wheels and $V_{moy}$ is their average. $K_{corr}$ is a correction coefficient whose value is advantageously that of the function represented in FIG. 4, equal to 1 for $$\frac{V_{max}}{V_{min}} < 1.15,$$

to 0.6 for $$\frac{V_{max}}{V_{min}} > 1.4,$$

and being linear between these two values.

The curve $V_{eAR}$ thus obtained is also represented in FIG. 2; it can be seen that it is very close to the value $V_{AR}$, except for extreme turning angles of the front wheels 2D and 2G.

The invention therefore makes it possible to evaluate the speed $V_{AR}$ with very good accuracy using only the speeds of the front wheels 2D and 2G. Module 4 can comprise other inputs to receive additional parameters, but information relating to direct measurement on the 3D and 3G rear wheels are not provided.

The result $V_{eAR}$ at the output of module 4 can be used for various applications. However, a particularly interesting method is the decision whether to control braking or reversely anti-lock braking of the rear wheels 3D and 3G, depending on situations. Back to FIG. 2 for explanation.

When a direct and reliable speed measurement of the rear wheels 3D and 3G is not available, it is usual to define a threshold speed Vs equal to, for example, 0.8 $V_{moy}$. Indeed it is considered that the speeds $V_{AR}$ and $V'_{AR}$ of the rear wheels 3D and 3G should not deviate too far from the speed $V_{moy}$, and especially not drop too far below it, which would mean that these rear wheels would lock up. But in reality $V_{AR}$ is below the threshold speed Vs in tight bends, which means that traditional decision modules wrongly diagnose lock of the inside wheel, here 3G, and command its anti-lock braking system if braking the vehicle is requested.

In accordance with an application of the invention, the evaluation $V_{eAR}$ of the speed of the rear inner wheel obtained by module 4 is used to define a new decision threshold V's, deduced from $V_{eAR}$ by the same constant correction coefficient as previously. A new decision threshold $V'_s$ is thus obtained which increasingly sharply deviates from Vs for tighter bends, and which remains below the normal speed $V_{AR}$ of the inner wheel 3G, except possibly for the tightest bends. Anti-lock braking will therefore be imposed only if a decrease in rear wheel speed below these new threshold values $V'_s$, and sharply below normal speeds VAR and $V'_{A}R$, is detected.

The control system can comprise, downstream of module 4, a decision module 7 which receives the evaluation $V_{eAR}$, calculates V's and compares its value to the speeds $V_{AR}$ and $V'_{AR}$ provided by other parameter providing modules 8 of the control system. Based on the result of the comparison, the command of a brake pedal 9 is applied (braking is allowed if $V_{eAR} \geq V'_s$) or not (anti-lock braking is imposed if $V_{eAR} < V'_s$) to the actuator 10 of a brake 11, which may be a drum brake, also used for parking on the rear wheel 3G. A similar device also exists for the other rear wheel 3D.

The speed evaluation made here more precisely related to the inner rear wheel (here 3G) of the bend. An evaluation of the outer rear wheel (3D) could be made with an analogous module and a different generation function $V_{eAR}$, but it is the inner wheel that raises the most difficulties in driving.

NOMENCLATURE

1 Chassis
2G Front left wheel
2D Front right wheel
3G Rear left wheel
3D Rear right wheel
4 Module
5 Rotation sensor
6 Rotation sensor
7 Decision module
8 Parameter providing modules
9 Brake pedal
10 Actuator
11 Brake
A Turning angle
R Turning radius
V Speed

The invention claimed is:

1. A module for evaluating a speed of a rear wheel (3G, 3D) of an automobile, wherein the module is fed by input parameters which comprise, as the only speed parameters, evaluations of speeds of the front wheels (2G, 2D) of the automobile, in that the speed of the rear wheel is evaluated by a formula $$V_{eAR} = \left(\frac{V_{moy}}{3} + \frac{2}{3}\frac{V_{min}^2}{V_{max}}\right)K_{corr},$$

where $V_{eAR}$ is the rear wheel speed evaluation, $V_{min}$ and $V_{max}$ the front wheel speed evaluations with $V_{min} \leq V_{max}$, $V_{moy} = \frac{1}{2}(V_{min}+V_{max})$, and $K_{corr}$ is a correction coefficient, and in that $K_{corr}=1$ for $$\frac{V_{max}}{V_{min}} \leq S_1,$$

and $K_{corr} \leq 1$ for $$\frac{V_{max}}{V_{min}} > S_1,$$

$S_1$ being a fixed threshold, and
wherein the module is configured to apply a braking command or not, based on the rear wheel speed $V_{eAR}$, thereby imposing anti-lock braking of said rear wheel.

2. The evaluation module according to claim 1, wherein $K_{corr}$ is decreasing when $$\frac{V_{max}}{V_{min}}$$

increases above $S_1$.

3. The evaluation module according to claim 2, wherein $K_{corr}$ is constant when $$\frac{V_{max}}{V_{min}} \geq S_2,$$

$S_2$ being a second fixed threshold with $S_2 > S_1$.

4. The evaluation module according to claim 3, $S_1=1.15$, $S_2=1.4$, wherein $K_{corr}$ is linear between $S_1$ and $S_2$ and $K_{corr}=0.6$ at $S_2$.

5. A device for controlling braking of an automobile, comprising the evaluation module according to claim 1.

6. A method for controlling an automobile comprising a device for controlling braking of an automobile, the device comprising a module for evaluating a speed of a rear wheel (3G, 3D) of the automobile, wherein the module is fed by input parameters which comprise, as the only speed parameters, evaluations of speeds of the front wheels (2G, 2D) of the automobile, the speed of the rear wheel is evaluated by a formula $$V_{eAR} = \left(\frac{V_{moy}}{3} + \frac{2}{3}\frac{V_{min}^2}{V_{max}}\right)K_{corr},$$

where $V_{eAR}$ is the rear wheel speed evaluation, $V_{min}$ and $V_{max}$ the front wheel speed evaluations with $V_{min} \leq V_{max}$, $V_{moy} = \frac{1}{2}(V_{min}+V_{max})$, and $K_{corr}$ is a correction coefficient, and in that $K_{corr}=1$ for $$\frac{V_{max}}{V_{min}} \leq S_1,$$

and $K_{corr} \leq 1$ for $$\frac{V_{max}}{V_{min}} > S_1,$$

$S_1$ being a fixed threshold,
and the method comprising a step of, after comparing evaluations of the speed of said rear wheel made by said module, applying a braking command or not, thereby imposing anti-lock braking of said rear wheel.

7. The method for controlling an automobile according to claim 6, wherein antilock braking is decided if said evaluations are lower than a reference speed of the automobile, multiplied by a constant coefficient of less than 1.

8. The method for controlling an automobile according to claim 7, wherein the reference speed is an average of the front wheel speed evaluations.

* * * * *